Sept. 29, 1942.                C. D. BRONSON                2,296,978
                               DIRECTION SIGNAL
                            Filed Sept. 24, 1941
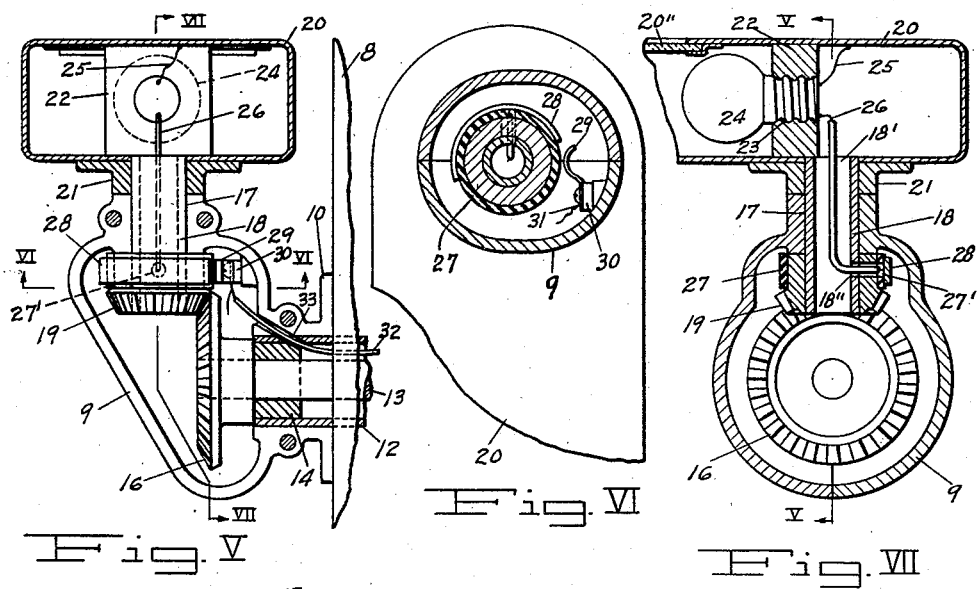
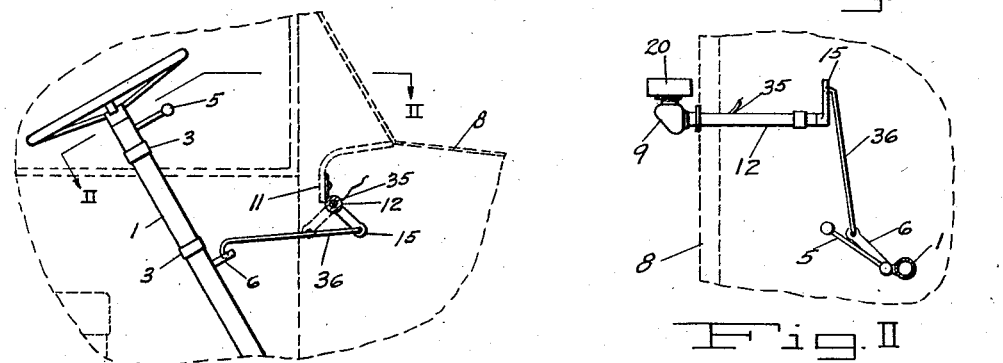
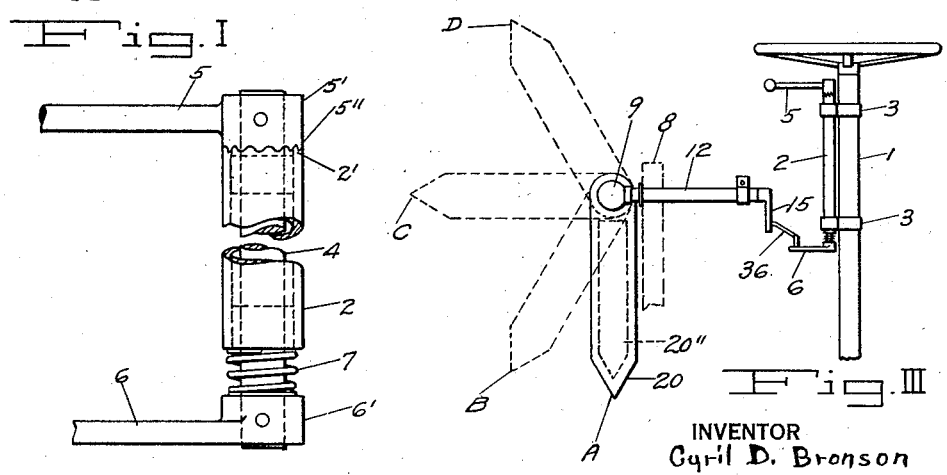
INVENTOR
Cyril D. Bronson
BY
Clive Hartson
ATTORNEY Patented Sept. 29, 1942

2,296,978

UNITED STATES PATENT OFFICE 2,296,978

DIRECTION SIGNAL

Cyril D. Bronson, Klamath Falls, Oreg.

Application September 24, 1941, Serial No. 412,147

4 Claims. (Cl. 116—35)

This invention relates to direction signals for installation upon automotive vehicles, and for operation as a signal to others to signal the proposed movements of the vehicle upon which it is mounted.

As most signals of the movement of a vehicle are given by the left hand of the driver thereof, one of the objects of this invention is to provide a signal which operates from a position proximate where hand signals are made.

Another object of the invention is to provide a semaphore type signal operating exteriorly of the vehicle body and manually controlled by a lever operable upon the steering column of the vehicle.

Another object of the invention is to automatically illuminate the signal arm when it is being employed for signalling.

Another object of the invention is to provide a simple operating mechanism for the signal.

The attainment of these and incidental objects is had by the mechanism and means described hereinafter and shown in the accompanying drawing, wherein—

Figure I is a side elevation of portions of the invention.

Figure II is a plan view of the invention, as indicated by line II—II of Fig. I.

Figure III is a rear elevation of the invention.

Figure IV is an enlarged fragmentary detail of the operating lever shaft and sleeve assembly.

Figure V is a horizontal section of the signal arm housing, as indicated by section line V—V in Figure VII.

Figure VI is the sectional view indicated by section line VI—VI in Fig. V.

Figure VII is the sectional view indicated by section line VII—VII of Fig. V.

Referring now to the drawing, numeral 1 indicates the steering column of an automobile. Mounted on the column, and axially parallel, is a sleeve 2, the attachment being made by means of clamps 3. A shaft 4 is journaled in sleeve 2. The upper end of the sleeve is provided with rounded teeth 2'. A lever 5, by means of its hub 5' is mounted to the upper end of shaft 4. The underside of the hub has teeth 5'' which mesh with teeth 2'. Mounted to the lower end of the shaft 4 by means of its hub 6' is an arm 6. A space exists between the bottom of sleeve 2 and hub 6', and mounted therebetween and coiled about shaft 4 is coil spring 7. The action of this spring is to press shaft 4 down thus compelling teeth 2' and 5'' to mesh. The meshing of the teeth prevents loose rotation of the shaft, though permitting rotation when force is applied to lever 5, as when the lever is manually operated. Lever 5 is mounted to the left hand side of the steering column, the side opposite that on which, in modern cars, the gear shift lever is mounted. The latter is not shown herein.

A casing 9, by means of flange 10, is mounted to the exterior of the car body 8. This position of the mounting is just forward and just a little below a line drawn transversely along the bottom of the dash 11. The casing has a sleeve extension 12 which extends into the interior of the car. A shaft 13 is journaled in suitable bearings in the sleeve 12. One of the bearings, indicated by numeral 14 is positioned at the outer end of the sleeve, while a similar bearing, not shown, is provided at the inner end of the sleeve. Shaft 13 projects sufficiently from the inner end of sleeve 12 to permit mounting thereon of the arm 15. On the outer end of shaft 13, which projects within casing 9, is mounted a bevel gear 16.

Casing 9 has a bearing 17. A hollow shaft 18 is rotatively positioned in this bearing, though its ends project respectively in and out of the casing. Upon the inner end of the shaft 18 is mounted a bevel gear 19 which meshes with gear 16. Gear 19 is smaller than gear 16, so that rotation of the former is nearly two to the one of the latter. Mounted on the outer end of shaft 18 is a hollow signal arm 20. This arm is provided with a hub 21 for mounting upon shaft 18. Arm 20 at opposite sides is provided with illuminable faces 20''.

A cross member 22 is positioned within arm 20. The cross member has an electric lamp socket 23 in which is seated lamp 24. Socket 23 has a negative connection 25 to the arm 20. It also has a positive connection 26. The latter connection leads into shaft 17, through hole 18'' in the shaft and in the hub of gear 19, and through hole 27' in the insulate ring 27 mounted about said hub, and is secured to contact plate 28 mounted partially about said ring. Hence, only when a source of electrical energy contacts plate 28, is lamp 24 illuminated. Such contact is provided by means of a spring contact member 29 mounted upon an insulate base 30 within casing 9. An electrical connection, wire, 32 connects with contact member 29, leads through hole 33 in casing 9, sleeve 12, and bearing 14, into the space between shaft 13 and sleeve 12, and thence through the wall of sleeve 12 at point 35, from whence it connects with a source of electrical energy, not shown.

Arms 15 and 6 are connected by means of a link 36. It is necessary that the pivotal connection between the link and respective arms be somewhat free, and this is best obtained by providing a ball and socket connection between link and arms as is shown by the connection between link 36 and arm 6 in Fig. I.

When it is desired to operate the signal, the lever 5 is rocked. This movement of the lever transmits movement through arm 6, link 36 and arm 15 to shaft 13, and by means of the bevel gears 16 and 19 to shaft 18 and signal arm 20. Figure III illustrates the various signal positions of arm 20 which may be had by manipulating the lever. Position A is neutral or non-operative position; position B, the position for signalling a stop; position C, the position for signalling a left turn; and position D, signalling a right turn. Immediately upon the movement of the signal arm from neutral position A, contact 29 contacts plate 28, closing the electrical circuit through and illuminating lamp 24, thus illuminating plates 20", which may be of a red or warning tinge. However, when the signal arm returns to neutral or A position the contact is broken, and the electric circuit is opened.

While the form of improvement herein shown and described is admirably adapted for fulfilling the objects primarily stated, it is to be understood that it is not intended to confine the invention to the one form of embodiment herein shown and described, as it is susceptible of embodiment in various forms, all coming within the scope of the claims which follow.

What I claim is:

1. A direction signal, comprising a casing adapted for mounting exteriorly upon the body of a motor vehicle and having an extension projecting into such vehicle, a shaft journaled within the casing extension, its inner end projecting beyond the end of the extension, and its outer end projecting into the casing, a bevel gear mounted upon the outer end of said shaft, an arm mounted upon its inner end, a second shaft journaled within the casing with one end within the casing and the other without, a bevel gear mounted upon the inner end of the second shaft meshing with the first gear, a signal arm mounted upon the outer end of the second shaft, a sleeve mounted axially parallel upon the steering column of the vehicle, a shaft journaled within the sleeve, the upper end of the sleeve having rounded teeth, a lever mounted upon the upper end of the last shaft provided with rounded teeth meshing with the teeth of the sleeve, an arm mounted upon the lower end of the last shaft, a spring mounted between the lower end of the sleeve and the last arm forcing the last shaft downward and causing the aforesaid teeth to mesh, and a link pivotally connected between the first and last mentioned arms.

2. A direction signal, comprising a casing adapted for mounting exteriorly upon the body of a motor vehicle and having an extension projecting into such vehicle, a shaft journaled within the casing and extension, its inner end projecting beyond the end of the extension, and its outer end projecting into the casing, a bevel gear mounted upon the outer end of said shaft, an arm mounted upon its inner end, a second shaft journaled within the casing with one end within the casing and the other without, a bevel gear mounted upon the inner end of the second shaft meshing with the first gear, a signal arm mounted on the outer end of the second shaft, a sleeve mounted axially parallel upon the steering column of the vehicle, a shaft journaled within the sleeve, a lever mounted upon the upper end of the last shaft, an arm mounted upon the lower end of the last shaft, and a link pivotally connected between the first and last mentioned arms.

3. A direction signal, comprising a casing mounted upon the exterior of a motor vehicle, a shaft having one end journaled in the casing projecting into the vehicle interior, a bevel gear mounted on the outer end of said shaft, an arm mounted on the inner end of said shaft, a second shaft journaled within the casing with one end within the casing and the other without, a bevel gear mounted upon the inner end of the second shaft meshing with the first gear, a signal arm mounted upon the outer end of the second shaft, a sleeve mounted axially parallel upon the steering column of the vehicle, a shaft journaled within the sleeve, a lever mounted upon the upper end of the last shaft, an arm mounted upon the lower end of the last shaft, and a link pivotally connected between the first and last mentioned arms.

4. A direction signal, comprising a casing mounted upon the exterior of a motor vehicle, a shaft having one end journaled in the casing projecting into the vehicle, a bevel gear mounted upon the outer end of said shaft, an arm mounted on the inner end of said shaft, a second shaft journaled within the casing with one end within the casing and the other without, a bevel gear mounted upon the inner end of the second shaft meshing with the first gear, a signal arm mounted upon the outer end of the second shaft, a shaft journaled upon the steering column of the vehicle, a lever mounted upon the last shaft, an arm mounted upon the last shaft, and a link pivotally connected between the first and last arms.

CYRIL D. BRONSON.